Oct. 11, 1960 R. N. RHODES 2,956,202

TELEVISION DEFLECTION CIRCUITS

Filed June 25, 1958

INVENTOR.
ROLAND N. RHODES

BY

ATTORNEY 2,956,202

TELEVISION DEFLECTION CIRCUITS

Roland N. Rhodes, Levittown, Pa., assignor to Radio Corporation of America, a corporation of Delaware Filed June 25, 1958, Ser. No. 744,540

12 Claims. (Cl. 315—27)

Figures 1, 2:
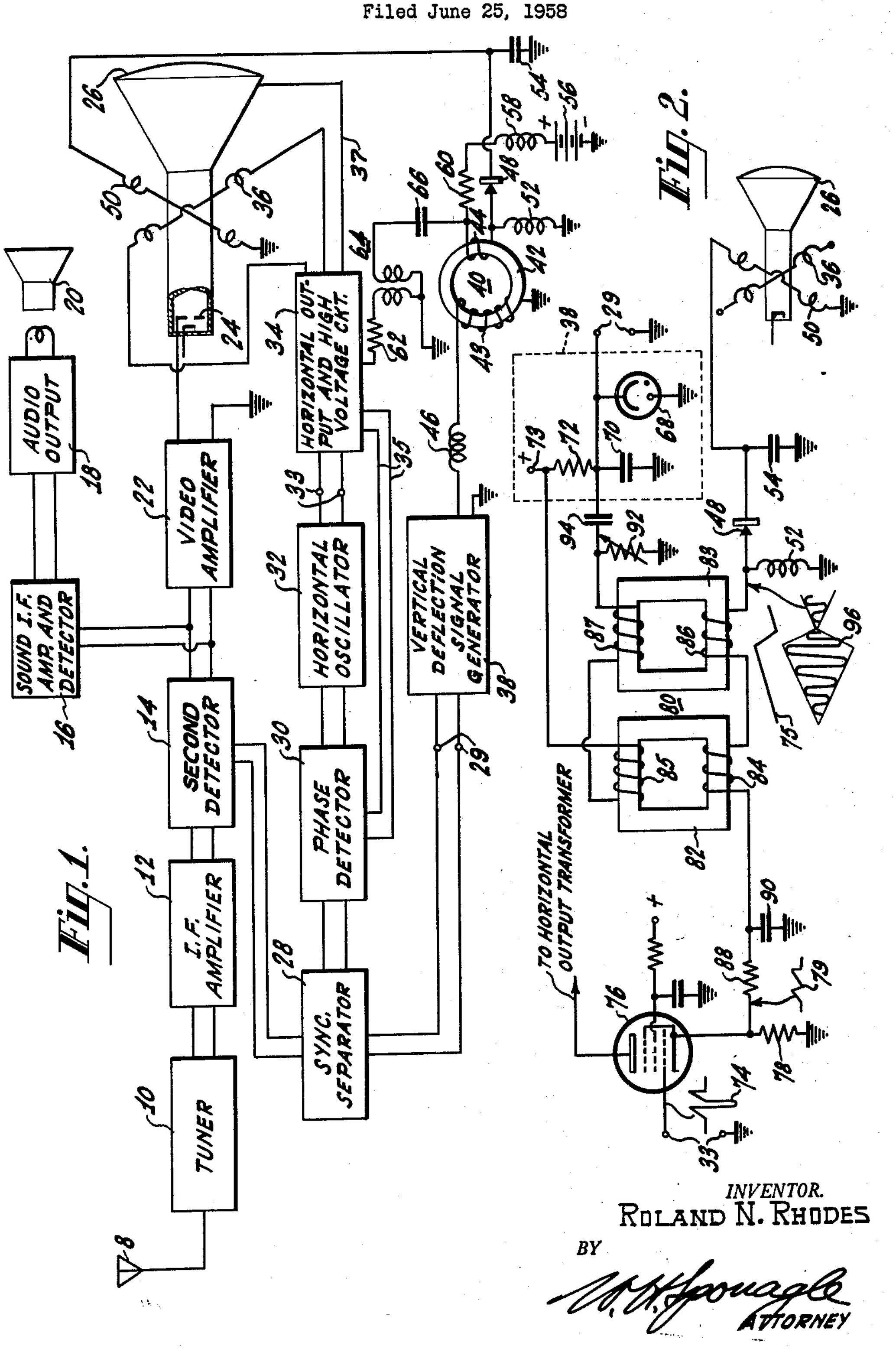

This invention relates to deflection circuits for television receiving systems and in particular to television vertical deflection circuits in which amplification of the vertical deflection signal is obtained by means of an amplifier of the magnetic type.

In the usual vertical deflection circuit of a television receiver, a sawtooth deflection wave is generated and then amplified by one or more electron tubes. Considerable power is dissipated during the operation of the deflection circuit. For this reason, the power gain of the deflection amplifier circuits must be relatively great in order to provide proper deflection of the receiver kinescope electron beam. Thus, it would be of considerable advantage to use magnetic amplifiers, which are characterized by relatively large power gains, to amplify the deflection signal. In addition to the large power gain obtainable, magnetic amplifiers are characterized by relatively efficient operation. Furthermore, magnetic amplifiers are very stable devices and are less affected by variations in the power supply voltage than the usual vacuum tube. While possessing these advantages, the use of magnetic amplifiers is often not desirable since a relatively high frequency alternating current signal is needed as a power supply source.

It is an object of this invention to provide an improved vertical deflection circuit for television receiving systems in which amplification of the vertical deflection signal is obtained by means of a magnetic amplifier.

It is another object of the present invention to provide an improved vertical deflection circuit for television receiving systems including a magnetic amplifier, wherein a separate supply source of alternating current signals is not needed for proper operation of the magnetic amplifier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figure 1 is a schematic circuit diagram, partially in block diagram form, of a television receiver embodying the invention; and Figure 2 is a schematic circuit diagram of a vertical deflection circuit suitable for use in a receiver of the type illustrated in Figure 1 and embodying the invention.

Referring now to the drawing, wherein like parts are indicated by like reference numerals in both figures, and referring in particular to Figure 1, a television receiver includes an antenna 8 which receives composite television signals and from which the received signals are applied to a tuner 10. The tuner 10 would normally include, as is conventional, a radio frequency amplifier and a frequency converter for converting the radio frequency signals to intermediate frequency signals. The intermediate frequency signals are amplified by an intermediate frequency amplifier 12 and applied to a second detector 14 for deriving the composite television signals from the intermediate frequency signals. The sound intermediate frequency signals (produced by the beat between the picture carrier and the modulated sound carreir) are amplified and detected in the sound I.F. amplifier and second detector stage 16, and the resultant audio frequency signal is amplified by the audio frequency output stage 18. The amplified audio signal is then applied to a loudspeaker 20 for sound reproduction.

The composite television signals derived from the second detector 14 are amplified by a video amplifier 22 and applied to the control grid 24 of a kinescope 26 for picture reproduction. The composite television signals are also applied to a sync separator circuit 28. Horizontal synchronizing pulses derived from the sync separator circuit 28 are applied to a phase detector 30. The phase of the horizontal synchronizing pulses are compared by the phase detector 30 with the phase of a sawtooth wave, which may be derived from any convenient point in the circuit, such as from the horizontal deflection circuit 34. This sawtooth wave is applied to the phase detector 30 through the conductive leads 35. The error voltage developed in the phase detector 30, as a result of the phase comparison between the horizontal synchronizing pulses and the sawtooth wave, is applied to a horizontal oscillator 32 to synchronize its output with the received synchronizing pulses. The horizontal oscillator 32 is operative to generate an oscillator signal at the frequency of the received horizontal synchronizing pulses.

The horizontal oscillator 30 is connected to a horizontal output and high voltage circuit 34 which is connected with the horizontal deflection yoke winding 36 of the kinescope 26. The horizontal output and high voltage circuit 34 may be any one of a number of conventional types and is operative to provide deflection current through the yoke winding 36 and to develop a large ultor voltage for the kinescope 26. This voltage is applied to the kinescope through the lead 37.

The sync separator circuit 28 also supplies, through the terminals 29, vertical synchronizing pulses to a vertical deflection signal generator 38. The vertical deflection signal generator 38, which may be any one of a number of well known types, is operative to generate a sawtooth current wave of sufficient magnitude to scan over the vertical deflection angle of the kinescope at the field-scanning rate. Amplification of the sawtooth wave generated by the vertical deflection signal generator 38 is provided, in accordance with the present invention, by a magnetic amplifier 40. By using a magnetic amplifier which has a relatively high power gain, the magnitude of the sawtooth wave generated by the vertical deflection signal generator 38 need not be very large. The magnetic amplifier 40 need not be of any particular type or form, and as illustrated in the embodiment of Figure 1 comprises a magnetic core 40 upon which are wound an input winding 43 of relatively large inductance and a load or control winding 44 of relatively low inductance.

One terminal of the input winding 43 is grounded, while the other terminal is connected through a choke coil 46 to the output terminal of the vertical deflection signal generator 38. The choke coil 46 provides a high impedance to alternating currents so that the voltage induced in the input winding 43 from the control winding 44 is unable to produce circulating signal currents which would absorb power.

Output signals from the power amplifier 40 are derived from the control or output winding 44, one terminal of which is connected through a diode rectifier 48 to one terminal of the vertical deflection winding 50 of the kinescope 26. The other terminal of the vertical deflection winding 50 is grounded. An inductor 52 is connected from the junction of the output terminal of the control winding 44 and the anode of the diode rectifier 48 to ground and provides a direct current return path for the control circuit. A filter capacitor 54 is connected from the junction of the cathode of the diode rectifier 48 and the ungrounded terminal of the deflection winding 50 to ground. A direct current supply voltage is supplied to the magnetic amplifier 40 from a battery 56, the negative terminal of which is grounded. The positive terminal of battery 56 is connected through an inductor 58 and a resistor 60 to the control winding 44 and through the choke 52 to ground.

The relatively high frequency alternating current supply signal for the magnetic amplifier 40 is derived, in accordance with the invention, from the horizontal output and high voltage circuit 34. This signal, which for present commercial television receivers is at the nominal line frequency of 15,750 cycles per second, is supplied to the magnetic amplifier 40 through a current limiting resistor 62, a transformer 64, and a coupling capacitor 66, which is connected to the control winding 44 of the magnetic amplifier. The alternating current supply signal may be derived from any convenient point in the horizontal output and high voltage circuit 34 and may, for example, be the horizontal kick-back pulses. Thus, the alternating current power supply for the vertical deflection magnetic amplifier 40 is obtained from existing circuits in the television receiver.

In operation, the magnetization of the iron core 42 of the magnetic amplifier 40 is determined by the flow of current through the control winding 44 of the magnetic amplifier. Direct-current from the battery 56 flows from the positive terminal thereof through the choke 58 and the resistor 60 and through the control winding 44 and the inductor 52 to ground. The alternating current signal (at a nominal frequency of 15,750 cycles per second) which is derived, in accordance with the invention, from the horizontal output and high voltage circuit 34, is also applied to the control winding 44. The inductance of the control winding 44 is proportional to the permeability of the core 42. Accordingly, as the flow of current through the control winding 44 increases, and thus the permeability of the core decreases, the inductance of the control winding 44 will also decrease. When the core 42 is saturated, the inductance of the control winding 44 is at a minimum. The current flow in the control winding 44 thus provides predetermined current flow in the output circuit. Accordingly, small changes in the current in the control winding 44 vary the magnetic state of the iron core considerably to provide control of the output power and thus power amplification. When the sawtooth signal at a frequency of 60 cycles per second, which is generated by the vertical deflection signal generator 38, is applied to the input winding 43 through the choke 46, a signal current will flow in the output circuit which is representative of the input sawtooth signal modulated by the relatively high frequency supply signal from the horizontal deflection circuit 34. The output signal is rectified by the diode rectifier 48 to provide a sawtooth current which is applied to the vertical deflection winding 50 of the kinescope 26, thus providing vertical deflection of the electron beam thereof. The capacitor 54 is a by-pass to the relatively high frequency (15,750 cycles per second) supply signal.

The magnetic amplifier 40 thus serves to provide high power gain, that is, the useful output power is much greater than the control power. For this reason, a relatively low level vertical deflection signal generator may be used. In addition, the use of a magnetic amplifier to amplify the vertical deflection signal insures stable and reliable operation despite variations in the supply voltage. These advantages are obtained, moreover, by provision of the invention, without the need of a separate high frequency signal supply source for the magnetic amplifier. That is to say, the high frequency signal for the magnetic amplifier is obtained from an existing current, i.e., the horizontal circuit of the television receiver.

A circuit suitable for use in the receiver of Figure 1 is illustrated in Figure 2, reference to which is now made. As was explained hereinbefore, the relatively high power gains obtainable by the use of a magnetic amplifier permits a relatively low level vertical signal generator to be used. Thus, the vertical deflection signal generator 38 of Figure 2 is of the neon tube type and comprises a neon tube 68 and a charging capacitor 70. The capacitor 70 is charged in a linear manner through a resistor 72 from a positive direct current supply terminal 73, and discharges through the neon tube 68 upon application of vertical synchronizing pulses to the terminals 29. The vertical synchronizing pulses increase the voltage across the neon tube 68 to a point exceeding the firing potential of the tube, causing the tube to conduct and providing a low impedance discharge path to ground for the charging capacitor 70. In this matter, sawtooth signals at the field frequency rate of 60 cycles per second are generated. This signal is illustrated by the waveform 75.

Horizontal deflection signals 74 generated by the horizontal oscillator of the receiver are applied through the terminals 33 to the control grid of an electron discharge tube 76 of the pentode type. Amplified horizontal deflection signals are derived from the plate of the tube 76 and applied to the horizontal output transformer of the receiver, as is conventional. The cathode of the tube 76 is connected to ground through a resistor 78, across which the relatively high frequency (15,750 cycles per second) supply signal 79 is derived for application to the magnetic amplifier 80.

The magnetic amplifier 80 in the embodiment of the invention illustrated in Figure 2 includes a pair of iron cores 82 and 83. The cores 82 and 83 each include respective alternating current or load windings 84 and 86 and control or input windings 85 and 87. The alternating current windings 84 and 86 are connected in the same direction while the control windings 85 and 87 are connected in opposite directions. Since the control windings are connected in opposite directions, any alternating current supply voltage induced in one winding will be cancelled by the equal and opposite voltage induced in the second winding, thus reducing current flow at the horizontal line frequency in the control windings and obviating the need for choke coils. The same effect can be obtained by connecting the alternating current windings 84 and 86 in opposite directions. It is also to be noted that both the control and alternating current windings are connected in series. The alternating current windings could alternatively be connected in parallel.

The cathode of the horizontal output amplifier 76 is connected through a filter network comprising a series resistor 88 and a parallel capacitor 90 to the alternating current supply winding 84 of the first magnetic core 82. The filter network serves to remove the higher frequency components from the waveform 79. A relatively high frequency supply signal of approximately sinusoidal waveform is applied to the windings 84 and 86 in series. The vertical deflection output circuit for the magnetic amplifier of Figure 2 is identical to the output circuit illustrated in Figure 1.

A direct control current for the magnetic amplifier 80 is obtained by connecting the direct current positive supply terminal 73 to the series arrangement of the control windings 85 and 87. A direct current conductive path is thus provided between the positive terminal 73, through the control windings 85 and 87, and through a variable resistor 92 to ground. Variation of the resistance of the resistor 92 provides a means for adjusting the direct current bias current through the control windings 85 and 87. It is noted, in this connection, that in the circuit of Figure 1 the direct control current is applied to the winding to which the relatively high frequency supply signal is also applied. In the circuit of Figure 2, however, the direct control current is applied to the winding to which the input signal is applied. It should be understood that the control current could be applied to either winding in both circuits.

The sawtooth signal generated by the neon tube signal generator 38 is coupled through a capacitor 94 to the control winding 87 of the magnetic amplifier 80. This signal is, as noted above, of sawtooth waveform and is at a frequency of 60 cycles per second, which is the field frequency rate of the usual commercial television reecivier. As the current flow through the control windings 85 and 87 increases, the permeability of the cores 82 and 83 decreases and the inductance of the windings 84 and 86 will decrease. At core saturation, the inductance of the windings 84 and 86 will be at a minimum and maximum signal translation of the horizontal signal 79 will be provided therethrough. The signal appearing at the output terminals of the output winding 86 will thus be a 60 cycle sawtooth signal modulated by the horizontal signal at a frequency of 15,750 cycles per second and is of the form illustrated by the waveform 96. Because of the power gain obtained through the operation of the magnetic amplifier 80, the positive portion of the signal is a greatly amplified version of the sawtooth signal which is applied to the magnetic amplifier 80 from the neon tube signal generator 38. This signal is rectified by the diode rectifier 48 and filtered by the filter capacitor 54 to provide a sawtooth current through the vertical deflection winding 50 of the kinescope 26.

Vertical deflection circuits embodying the invention use a magnetic amplifier for obtaining high power gain and stable and reliable operation. By using a signal derived from the horizontal deflection circuits as the alternating current signal supply for the magnetic amplifier, these advantages are obtained without the need for a separate alternating current supply source.

What is claimed is:

1. In a television receiver having a deflection winding for a kinescope, a vertical deflection circuit including means for generating a vertical deflection signal, means including a magnetic amplifier coupled to said deflection signal generating means for amplifying said signal, a horizontal deflection circuit providing a source of signals of greater frequency than the frequency of said vertical deflection signal, means for applying said signals from said horizontal deflection circuit to said magnetic amplifier as the signal supply source therefor, and means coupling said amplifier to said winding for applying said amplified deflection signal to said deflection winding.

2. In a television reecviver including a kinescope having a horizontal deflection winding and a vertical deflection winding, the combination comprising, a vertical deflection signal generator for generating a vertical deflection signal, a horizontal deflection circuit for generating a horizontal deflection signal, means connecting said horizontal deflection circuit with said horizontal deflection winding for supplying a deflection signal thereto, means coupled to said vertical deflection signal generator for amplifying said vertical deflection signal including a magnetic amplifier having an alternating current supply winding, means connecting said magnetic amplifier with said vertical deflection winding for supplying a deflection signal thereto, means for deriving a supply signal from said horizontal deflection circuit, and means for applying said supply signal to the alternating current supply winding of said magentic amplifier.

3. In a television receiver including a kinescope having a horizontal deflection winding and a vertical deflection winding, the combination comprising, a vertical deflection signal generator operative to generate a sawtooth wave at the field frequency of said receiver, a horizontal deflection circuit operative to generate a horizontal deflection signal at the line frequency of said receiver and connected with said horizontal deflection winding for applying said horizontal deflection signal thereto, a magnetic amplifier, input circuit means for said magnetic amplifier connected to apply said sawtooth wave thereto, means for applying signal derived from said horizontal deflection circuit at said line frequency to said magnetic amplifier, output circuit means for deriving an amplified sawtooth wave at said field frequency from said magnetic amplifier, and means connecting said output circuit means with said vertical deflection winding for applying said amplified sawtooth wave thereto.

4. In a television receiver including a kinescope having a horizontal deflection winding and a vertical deflection winding, the combination comprising, a vertical deflection signal generator operative to generate a sawtooth wave at the field frequency of said receiver, a horizontal deflection circuit operative to generate a horizontal deflection signal at the line frequency of said receiver and connected with said horizontal deflection winding for applying said horizontal deflection signal thereto, a magnetic amplifier, input circuit means for said magnetic amplifier connected to apply said sawtooth wave thereto, means for applying a supply signal derived from said horizontal deflection circuit at said line frequency to said magnetic amplifier, output circuit means for deriving an amplified sawtooth wave at said field frequency from said magnetic amplifier and means including a diode rectifier direct-current conductively connecting said output circuit means with said vertical deflection winding for applying said amplified sawtooth wave thereto.

5. In a television receiver, the combination defined in claim 4 wherein said horizontal deflection circuit includes a horizontal output amplifying device, and wherein said amplifying device is connected with said magnetic amplifier for applying said supply signal at the line frequency thereto.

6. In a television receiver including a kinescope having a horizontal deflection winding and a vertical deflection winding, the combination comprising, a vertical deflection signal generator for generating a vertical deflection signal, a horizontal deflection circuit for generating a horizontal deflection signal, means connecting said horizontal deflection circuit with said horizontal deflection winding for supplying a deflection signal thereto, means for amplifying said vertical deflection signal including a magnetic amplifier having at least a pair of inductive windings, means for applying said vertical deflection signal to one of said windings, means for deriving an amplified vertical deflection signal from the other of said windings, means for applying said amplified signal to said vertical deflection winding, means for deriving a relatively high frequency alternating current supply signal from said horizontal deflection circuit, and means for applying said supply signal to said other winding of said magnetic amplifier.

7. In a television receiver, the combination defined in claim 6 wherein a direct supply current is applied to said one of said inductive windings.

8. In a television receiver, the combination defined in claim 6 wherein a direct supply current is applied to said other inductive winding.

9. In a television receiver including a kinescope having a horizontal deflection winding and a vertical deflection winding, a vertical deflection signal generator for geenrating a vertical deflection signal, a horizontal deflection circuit for generating a horizontal deflection signal, means connecting said horizontal deflection circuit with said horizontal deflection winding for supplying a deflection signal thereto, means for amplifying said vertical deflection signal including a magnetic amplifier, said magnetic amplifier including a first and a second magnetic core each having a pair of windings, means for applying said vertical deflection signal to one of the windings of said first core, means connecting said one winding of said first core with one winding of said second core, means connecting the other winding of said first core with the other winding of said second core, means for deriving an amplified vertical deflection signal from said other winding of said first core and for applying said amplified signal to said vertical deflection winding, means for deriving a relatively high frequency alternating current supply signal from said horizontal deflection circuit, and means for applying said supply signal to said other winding of said second core.

10. In a television receiver, the combination defined in claim 9 wherein said one windings of said first and second cores are connected in series and said other windings of said first and second cores are connected in series.

11. In a television receiver, the combination defined in claim 9 wherein said other windings of said first and second cores are connected in parallel.

12. In a television receiver, the combination defined in claim 9 wherein said one windings of said first and second cores are connected in opposite directions.

References Cited in the file of this patent

UNITED STATES PATENTS

| | | |
|---|---|---|
| 1,181,556 | Von Arco | May 2, 1916 |
| 1,544,381 | Elmen | June 30, 1925 |
| 2,792,547 | Horton | May 14, 1957 |
| 2,807,776 | Buechler | Sept. 24, 1957 |
| 2,820,156 | Kunnes | Jan. 14, 1958 |
| 2,832,019 | Cohen | Apr. 22, 1958 |
| 2,849,625 | Germain | Aug. 26, 1958 |